United States Patent [19]

Barnhouse

[11] 4,197,912
[45] Apr. 15, 1980

[54] OIL RECOVERY VIA SILICONE INTRODUCTION

[75] Inventor: James L. Barnhouse, Victoria, Tex.

[73] Assignees: John C. Thompson; Craig W. Thompson, both of Victoria, Tex.

[21] Appl. No.: 972,006

[22] Filed: Dec. 21, 1978

[51] Int. Cl.$^2$ ............................................. E21B 43/22
[52] U.S. Cl. .................. 166/305 R; 166/274
[58] Field of Search ........... 166/273, 274, 275, 305 R; 252/8.55 R, 8.55 D

[56] References Cited

U.S. PATENT DOCUMENTS

| | | | |
|---|---|---|---|
| 2,265,962 | 12/1941 | Bent et al. | 252/8.55 R |
| 2,465,237 | 3/1949 | Larsen | 166/305 R |
| 2,816,610 | 12/1957 | Fisher | 166/274 |
| 2,846,012 | 8/1958 | Lorenz et al. | 252/8.55 D |
| 2,935,475 | 5/1960 | Bernard | 166/274 |
| 3,036,630 | 5/1962 | Bernard et al. | 166/273 |
| 3,364,994 | 1/1968 | Sterrett | 166/305 R X |
| 3,616,858 | 11/1971 | Raza | 166/305 R |
| 3,751,371 | 8/1973 | Redmore et al. | 252/8.55 D X |

Primary Examiner—Stephen J. Novosad
Assistant Examiner—George A. Suchfield
Attorney, Agent, or Firm—Frank S. Vaden, III

[57] ABSTRACT

This invention concerns introduction of a silicone-containing composition and a liquid hydrocarbon propellant into an oil and gas reservoir. The silicone-containing composition improves the interface between the reservoir fluids and solids facilitating release of natural gas dissolved or entrained in oil and water. The liquid hydrocarbon propellant assists in dispersement of the silicone-containing composition in the reservoir and increases the mobility of the oil by lowering the viscosity of the oil through dilution. The action of the silicone-containing composition improves recovery efficiency through conservation of primary and secondary energy.

5 Claims, No Drawings

OIL RECOVERY VIA SILICONE INTRODUCTION

BACKGROUND OF THE INVENTION

1. Field of the Invention

This invention pertains to an improvement in the efficiency with which oil and gas are recovered from an oil and gas reservoir by introducing a silicone-containing composition comprised of silicone and an organic solvent into the oil and gas reservoir.

2. Description of the Prior Art

Oil, gas and water exist in varying degrees in oil and gas reservoirs where retentive forces derived from interfacial tensions between these different reservoir fluids and the reservoir rock preclude the recovery of all oil and gas present. These hydrocarbons and water are contained under pressure within the reservoir. Recovery of these reservoir fluids is accomplished by completing a well in the reservoir and using existing or artificially created pressure differentials to drive the reservoir fluids toward the low pressure area caused by the well.

Pressure upon the reservoir by overlying earth strata, hydrodynamic or hydrostatic forces of encroaching edge water, gravity, the resilient expansion of the compressed strata, and the forces of interfacial phenomena cause the compaction of the natural gas and oils. Natural gas is dissolved in the oil, and to a much lesser extent may be dissolved in the water or adsorbed on the mineral surfaces of the reservoir rock, thereby reducing the area occupied by the reservoir fluids.

Oil is capable of holding large quantities of natural gas in solution, where saturation is determined by temperature and pressure subjected on the reservoir in addition to the molecular composition of the hydrocarbons.

The "free gas", that which is not dissolved in oil or water, generally accumulates in one or more gas caps located above the oil-gas interface in the reservoir rock. The heavier oil settles to the lower areas of the reservoir. Water is invariably found in the oil and gas reservoir. This water is either connate water retained by capillarity within the smaller interstices of the rock during the formation of the reservoir, or water that has accumulated where the gravitational segregation of the reservoir fluids is incomplete.

The completion of a well in the reservoir creates a low pressure area. The reservoir fluids expand to fill this low pressure area until an equilibrium is reached. There are several "drive" forces causing this migration as well as other retentive forces that must be overcome before movement will take place. The major drive forces are gravity; "depletion drive", caused by the expansion of the free gas trapped at high points or caps; "solution drive", caused by release and expansion of natural gas from the oil and water; and "water drive", produced by the hydrodynamic or hydrostatic force of encroaching edge water. Interface phenomena, such as surface free energy, surface tension, interfacial tension, adsorption, adhesive forces, pore friction during fluid movement, and capillarity play important roles in the retention and movement of reservoir fluids.

Maximum efficiency of oil recovery depends on numerous factors including oil viscosity, rate of recovery, retentive forces acting upon the reservoir fluids, the composition of the reservoir rock, and especially maintenance of both a pressure gradient and sufficient oil saturation at the well.

The efficiency rate for oil recovery by solution drive when used alone is quite low, estimated at being between 10 and 30 percent. This low recovery rate is attributed to the limited amount of gas available and the high gas-oil recovery ratio commonly present. This high gas-oil recovery ratio has three bases. First, the natural gas with greater mobility than the oil due to its lower viscosity, forms channels through the oil directly to the well thereby carrying less oil during expulsion from the reservoir. Secondly, the most efficient production rate is often too slow to profitably produce the oil, therefore production is increased by allowing the pressure gradient within the well to drop rapidly. Third, as the gas is released from the oil in the form of tiny bubbles the oil viscosity is temporarily lowered, but as the gas bubbles consolidate the phase continuity of the remaining oil increases as does the oil viscosity making the oil more resistant to movement.

The depletion drive effect of trapped free gas extends capillary pressure that drives the reservoir fluids from pore to pore toward the low pressure area around the well. As the reservoir fluids are extracted from the well, a void is created that is filled by the reservoir fluids driven by the expanding natural gas. Professor Lester Charles Uren in his book entitled *Petroleum Production Engineering* (1953) pictures this void as being filled in the early stages of production by a gas-oil froth in which the gas is imprisoned within the oil films in the form of bubbles. This froth is unstable and eventually gravitational settling of the oil occurs with the heavier more viscous oil tending to occupy the lower portions of the strata to which it has access.

As the pressure in the well, and thereby the reservoir, drops, somewhere along the pressure gradient the bubble point is reached and tiny bubbles of natural gas are released from the oil and begin to expand. These bubbles are pictured by Uren as linking together to form multitudes of tiny channels capable of quick dissemination of natural gas to tangential low pressure areas. These bubbles, enclosed by an oil film, sometimes break permitting two or more to join forming a larger bubble; or a larger bubble may be broken into a multiplicity of smaller bubbles when necessary to pass through smaller pore spaces. These gas bubbles, however, continue to carry some oil with them, and are delivered into the well largely in the form of films on gas bubbles: a froth rather than a liquid. If the reservoir pressure drops considerably below the bubble point, released gas with its lower viscosity expands to occupy more and more area proximate to the well. The amount of oil that clings to the natural gas will decrease as the volume of gas near the well increases. Further, the formation of channels of natural gas tends to deliver the natural gas to the well without displacing or carrying much oil. This precipitates a high gas-oil ratio and low recovery efficiency.

In replacing oil and gas in the reservoir, encroaching edge water acts to maintain the pressure gradient within the reservoir while flushing the reservoir fluids out of the rock pores and driving these fluids toward the well. Where an active water drive is available, there is usually an abundance of energy present, such that if gas and oil are produced too fast the well can be shut down for a period of time and the pressure will be replenished. Water drive, therefore, has a higher efficiency rate than depletion or solution drive forces when used alone, but even under the best circumstances an estimated 20 percent of the recoverable oil remains within the pool with most pools leaving over 40 percent behind.

These drive forces may act in concert, but usually one drive force will dominate at any given time. The recovery efficiency may be improved through the use of applied artificial force, such as by injection of gas or water flooding. This form of pressure maintenance or repressurization is often accomplished by conventionally pumping the desired gas or water into the reservoir through neighboring wells.

Other methods of secondary recovery include in situ combustion, heat injection, or the use of a foam to drive the reservoir fluids to the well. However, all of these applied artificial forces, with the exception of in situ combustion, which is very inefficient anyway, do not take substantial advantage of the existing energy available through release of dissolved or entrained natural gas present in the oil.

It has long been recognized that liquid organo-silicon and organo-silicate condensation products or polymers may be employed an anti-foaming agents in hydrocarbon oils which tend to foam or froth when agitated and/or are exposed to various gases. Such materials are preferred an anti-foaming agents since they have little effect on the generally desired properties of oil. However, in spite of such long available knowledge, it has not previously been recognized that such silicone-containing anti-foaming agents were useful in pressure maintenance in secondary recovery action to obtain oil from oil and gas reservoirs.

Therefore, it is a feature of the present invention to provide an improved process of providing pressure maintenance in secondary recovery action to obtain oil from oil and gas reservoirs.

SUMMARY OF THE INVENTION

A "silicone" (hereinafter defined), preferably in liquid form is introduced into an oil and gas reservoir. The silicone may be mixed with an organic solvent, preferably a liquid hydrocarbon, to facilitate handling and pouring. The resultant silicone-containing composition is poured or forced into the oil and gas well to be treated. Preferably, a liquid hydrocarbon propellant is forced into the well behind the silicone-containing composition by a conventional pumping method for introducing fluids into an oil and gas reservoir carrying the silicone-containing composition with it into the reservoir. The liquid hydrocarbon propellant facilitates dispersion of the silicone containing solution within the reservoir while increasing the mobility of the crude oil by lowering the viscosity of the oil. Alternatively, the silicone can be mixed directly with the liquid hydrocarbon propellant and simultaneously injected into the oil and gas reservoir. The silicone apparently improves the interface between gas and oil-gas and water remarkably resulting in the release of entrained or dissolved natural gas from the oil. The natural or existing energy available from this reaction provides greater recovery efficiency and conserves primary and secondary energy.

So that the above-recited features, advantages and objects of the invention, as well as others which will become apparent, are attained and can be understood in detail, more particular description of the invention is set forth below with respect to typical embodiments thereof, but the described embodiments should not be considered limiting of its scope, for the invention may admit to other equally effective embodiments which will be apparent from the description to one of ordinary skill in the art.

DESCRIPTION OF THE PREFERRED EMBODIMENTS

Completion of an oil well upsets the equilibrium within an oil and gas reservoir. Simultaneously and to a varying degree expansion of the free gas, the release and expansion of the dissolved gas, and sometimes the encroachment of edge water, work to overcome (1) the interfacial forces holding the oil and gas within the pore system and (2) the viscous resistance of gas and oil to movement, driving the reservoir fluids toward the low pressure area created by the well. The energy provided by natural water drive, although generally uneconomical to use alone due to low magnitude, is limitless. Energy provided by the expansion of natural gas, as well as the release of such gas by the oil, however, is limited. Thus, at some point in time the energy and thereby the productivity of the well, will decrease such that it becomes necessary to employ additional drive force energy to recover oil profitably.

The present invention is useful to assist primary recovery through pressure maintenance, or to provide secondary recovery drive energy where productivity has for practical purposes ceased.

The term silicone(s), as used herein, refers to compounds, preferably liquid, which may be polymeric in nature which contain organic groupings and which contain at least one

group. A particularly preferred group of silicones are the polydimethyl siloxanes having the general formula:

with the value of n ranging from 0 to 2,000.

Another particularly useful class of silicones are those having the general formulas:

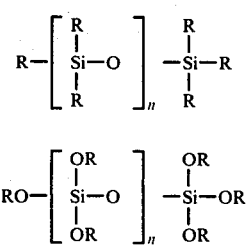

wherein R represents similar or dissimilar organic radicals such as alkyl, aryl, arakyl, alkaryl and heterocyclic groups; and the terminal R's and OR's or other R's and OR's may be substituted by hydroxyl groups and n is an integer equal to or greater than one. When R is an aromatic hydrocarbon grouping, intra-substituents may occur such as halogen, a nitrogen-containing radical such as $-NO_3$ or $-NH_2$, a sulfur-containing radical such as $-SO_3H$ or $-SH$, or a phosphorous-containing radical such as $-PO_3$ or $-PO_4$.

Typical compounds include dimethyl silicone, methyl phenyl silicone, ethyl butyl silicone, methyl cyclohexyl silicone, dicyclohexyl silicone, diphenyl silicone, hydroxy phenyl methyl silicone, phenyl propyl silicone, phenyl isopropyl silicone, tolyl butyl silicone, tolyl amyl silicone, phenyl hydroxy ethyl silicone and the corresponding polymers of methyl orthosilicate and ethyl orthosilicate.

Various types of silicones and methods of preparation that are useful in the practice of this invention are described in the following U.S. and British Pat. Nos. and are incorporated by reference herein:

| | |
|---|---|
| 2,416,503 | 2,643,240 |
| 2,416,504 | 2,702,793 |
| 2,464,231 | 3,384,600 |
| 2,469,888 | 3,450,736 |
| 2,488,449 | 3,586,706 |
| 2,515,024 | 3,660,305 |
| 2,533,700 | 591,767 (British) |
| 2,571,090 | |

Silicone may be in liquid or solid form, although use of the liquid form is more convenient. Although any silicone having a low interfacial tension toward oil antifoaming characteristics with regard reservoir fluids and capable of being stably and finely dispersed therein should be effective to at least some degree, Dow Corning 200 Fluid, a commercially available polymer of dimethylsiloxane, has been used in the invention to produce the hereinafter described results. Dow Corning 200 Fluid, hereinafter referred to as "Dow Fluid", is available in viscosities from 0.65 to 2,500,000 centistokes, has a low surface tension, and readily wets clean surfaces to impart water repellency, release, and antifoam characteristics.

Typically, the silicones are too viscous to be poured directly into the well. Accordingly, for ease of handling, the silicone is mixed with a liquid hydrocarbon in which the silicone is soluble and/or can be dispersed. The resultant silicone hydrocarbon mixture or solution is introduced, as by pouring or pumping, into the recovery well to be treated.

To facilitate dispersement of the silicone solution in the reservoir, and also to increase the mobility of the oil by lowering the viscosity of the reservoir oil, a liquid hydrocarbon propellant is pumped or "squeezed" into the well simultaneously with or behind the silicone-containing solution.

The liquid hydrocarbon which is used as the propellant and also in which silicone is mixed, is preferably a liquid hydrocarbon solvent with a lower viscosity than the oil in place, does not react generally with silicone and oil, and can disperse or solubilize silicone. There are numerous types of liquid hydrocarbons that could be used, such as kerosene, naphthas, diesel fuel, and various petroleum distillation products, or even crude oil. One propellant that has been found effective is J.P. 4 Jet Fuel, also called Power Fuel, a naphtha containing about 10 percent kerosene and which is commercially available from Mid-America Petroleum Company, Inc. The naphtha is pumped into the recovery well under pressure using a conventional method for introducing fluids into an oil and gas reservoir such as a 318 hp pump truck as was used in the treatments described below.

The invention has been practiced on three separate occasions by treating the Welsh #1 well located in Labbette, Kansas. In each treatment one gallon of Dow Fluid having a viscosity of 12,500 centistokes was mixed with five gallons of diesel fuel and poured into the recovery well prior to pumping a liquid hydrocarbon propellant into the well. The casing of the well was "shut-in" for a period of time to permit greater dispersement of the injected fluid while the tubing was still permitted to produce.

The propellant in the first treatment was forty-nine barrels of crude oil and where the silicone present was about 664 ppm (parts per million) by volume. The "shut-in" time was twelve hours and the well was permitted to produce for twenty-five days. The average production was 1.5 barrels per day of 22° API (American Petroleum Institute hydrometer scale for measuring the specific gravity of liquids) gravity oil. The oil originally in place had a 19° API gravity, and the propellant had a 24° API gravity. Thus, the oil produced was approximately 16% propellant, as calculated by gravity change.

The second treatment used eighty barrels of J.P. 4 Jet Fuel, having an API gravity of 55°, as the propellant, and the casing was "shut-in" for twelve hours. The silicone present was about 397 ppm by volume. During the first 24 hours, the well flowed thirty barrels of oil having an API gravity of 35°, but production diminished thereafter resulting in a total average for forty days of 3.5 barrels per day of oil having a 24° API gravity. The oil produced was approximately 10% propellant.

The third treatment used fifty barrels of the same J.P. 4 Jet Fuel with a 55° API gravity as the propellant and the silicone present was about 629 ppm by volume. This time the casing was "shut-in" for one week. Thereafter, the production for the next forty days was 2.2 barrels per day of oil having a 21° API gravity. The oil produced contained only approximately 6% propellant.

In the third treatment it was found that an apparent gas cap had formed in the reservoir. This was indicated by pressure that had built up on the casing valve. It was further indicated when some natural gas escaped through the tubing carrying a large amount of oil with it that splattered the immediate area around the well head.

The amount of silicone, diesel fuel, and liquid hydrocarbon propellant may be varied. Further, the diesel fuel is not a necessity and silicone may be mixed directly with the liquid hydrocarbon used as the propellant or other similar organic solvent, either in a small amount and added to the well prior to the bulk of the liquid hydrocarbon propellant or mixed with all of the propellant to be used and injected simultaneously. Although any amount of silicone should have some effect, the size of the reservoir, the amount and type of hydrocarbons present in the reservoir including their viscosity, depth of the well, actual dispersement of the silicone and propellant mixture, and "shut-in" time prior to production will have such an effect that it will be difficult to determine the most effective amounts that should be used. In the treatment described above it was the inventor's attempt to use approximately 20 ppm by volume of silicone with regard to the probable amount of reservoir oil present. However, it will be appreciated that the amount of silicone vis-a-vis the amount of crude oil present in place will depend on the factors previously mentioned. However, any amount which is effective to enhance or stimulate primary or secondary recovery may be added.

The exact reaction of the silicone in the reservoir is unknown. There are several possible theories explaining the remarkable effects that silicone has on oil and gas recovery from an oil and gas reservoir. First, it may reduce the gas-oil ratio of recovered oil by rupturing gas bubbles entrained in the oil prior to escape from the reservoir. These gas bubbles are then free to migrate to the existing free gas caps or form new free gas caps, capable of providing drive energy by further expansion. This will provide greater recovery of the more dense oil. Secondly, the silicone may alter capillary retention in the formation. This would permit freer movement of the reservoir fluids. Third, the silicone may help prevent the eduction of foam or froth breaking the retentive forces that would otherwise hold the oil in various parts of the reservoir.

While particular embodiments of the invention have been described, it will be understood that the invention is not limited thereto, since modifications may be made and will become apparent to those skilled in the art. For example, the silicone and naphtha solution could be injected into an intake well in the same reservoir rather than squeezed into the recovery well. This would permit gas injection or water flooding to be used following the silicone injection providing additional energy to drive the reservoir fluids to the recovery well.

What is claimed is:

1. An improved method of recovering oil from an oil and gas reservoir comprising introducing an effective amount of a silicone-containing composition into said reservoir, said silicone having at least an

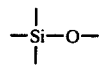

grouping, a low interfacial tension towards oil, capable of being stably and finely dispersed in crude oil, possessing antifoaming characteristics with regard reservoir fluids, and not substantially interfering with the desired properties of crude oil, dispersing said silicone-containing composition within the reservoir, capping said reservoir for an effective period of time permitting further interaction of the silicone-containing composition with the reservoir fluids precipitating release of entrained gas, and recovering oil from said reservoir.

2. The method of claim 1, wherein the silicone comprises a material selected from the class of compounds having the general formulas:

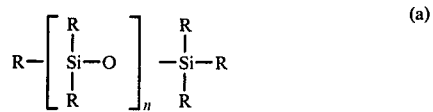

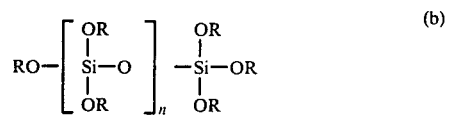

wherein R represents similar or dissimilar organic radicals such as alkyl, aryl, alkaryl, aralkyl and heterocyclic groups and the terminal R's and OR's or other R's and OR's may be substituted by hydrogen or hydroxyl groups; and n is an integer equal to or greater than one and mixtures of materials having the formulas (a) and (b).

3. The method of claim 1, wherein the silicone-containing composition is a polydimethyl siloxane having the general formula:

$(CH_3)_3Si[SiO(CH_3)_2]_nOSi(CH_3)_3$ with the value of n ranging from 0 to 2,000.

4. The method of claim 1 wherein the silicone-containing composition contains a liquid hydrocarbon.

5. The method of claim 1, wherein a liquid hydrocarbon propellant is forced in the well behind or simultaneously with the addition of the silicone-containing composition.

* * * * *